United States Patent
Malischewski et al.

(10) Patent No.: US 11,719,186 B2
(45) Date of Patent: Aug. 8, 2023

(54) PISTON FOR AN INTERNAL COMBUSTION ENGINE

(71) Applicant: MAN Truck & Bus SE, Munich (DE)

(72) Inventors: Thomas Malischewski, Heilsbronn (DE); Jens Dietrich, Heilsbronn (DE); Daniel Zülow, Feucht (DE)

(73) Assignee: MAN TRUCK & BUS SE, Munich (DE)

( * ) Notice: Subject to any disclaimer, the term of this patent is extended or adjusted under 35 U.S.C. 154(b) by 0 days.

(21) Appl. No.: 17/273,090

(22) PCT Filed: Sep. 16, 2019

(86) PCT No.: PCT/EP2019/074694
§ 371 (c)(1),
(2) Date: Mar. 3, 2021

(87) PCT Pub. No.: WO2020/058185
PCT Pub. Date: Mar. 26, 2020

(65) Prior Publication Data
US 2021/0324815 A1    Oct. 21, 2021

(30) Foreign Application Priority Data
Sep. 21, 2018 (DE) .......................... 102018123275.6

(51) Int. Cl.
| F02F 3/00 | (2006.01) |
| F02F 3/26 | (2006.01) |
| B23K 20/12 | (2006.01) |

(52) U.S. Cl.
CPC ............ F02F 3/26 (2013.01); B23K 20/1265 (2013.01)

(58) Field of Classification Search
CPC ................ F02F 3/14; F02F 3/003; F02F 3/12
(Continued)

(56) References Cited

U.S. PATENT DOCUMENTS

| 1,506,252 A | 8/1924 | Anton |
| 2,865,346 A | 12/1958 | Julius |
| (Continued) |

FOREIGN PATENT DOCUMENTS

| CH | 600148 | 6/1978 |
| CN | 1164612 A | 11/1997 |
| (Continued) |

OTHER PUBLICATIONS

German Search Report issued in 102018123275.6 dated May 2, 2019, 10 pages. No English translation available.
(Continued)

*Primary Examiner* — Long T Tran
*Assistant Examiner* — James J Kim
(74) *Attorney, Agent, or Firm* — Weber Rosselli & Cannon LLP

(57) ABSTRACT

The present disclosure relates to a piston for an internal combustion engine. The piston comprises a cover which at least partially covers a piston basehead of the piston. A heat-isolating air gap is formed between the cover and the piston basehead, which is fluidically connected to a combustion chamber and/or an upper side of the cover facing away from the heat-isolating air gap. The fluidic connection permits a fluid exchange to take place between the heat-isolating air gap and the combustion chamber. In this way, a pressure gradient can be reduced between the combustion chamber and the heat-isolating air gap. As a result, the cover is/can be kept thin without being deformed during combustion.

19 Claims, 1 Drawing Sheet

(58) Field of Classification Search
USPC .................................................. 123/193.6
See application file for complete search history.

(56) References Cited

U.S. PATENT DOCUMENTS

| | | | | |
|---|---|---|---|---|
| 4,018,194 A | * | 4/1977 | Mitchell | F02B 23/0603 |
| | | | | 123/669 |
| 4,128,092 A | * | 12/1978 | Yokota | F02F 3/003 |
| | | | | 123/193.6 |
| 4,455,974 A | * | 6/1984 | Shapiro | F16C 32/0685 |
| | | | | 123/47 R |
| 4,494,501 A | * | 1/1985 | Ludovico | F02F 3/14 |
| | | | | 123/669 |
| 4,553,472 A | * | 11/1985 | Munro | F02B 23/0675 |
| | | | | 92/176 |
| 4,592,318 A | | 6/1986 | Pouring | |
| 4,939,984 A | * | 7/1990 | Fletcher-Jones | F02F 3/003 |
| | | | | 123/193.6 |
| 5,809,962 A | * | 9/1998 | Abbott | F02F 3/14 |
| | | | | 92/213 |
| 2008/0041333 A1 | * | 2/2008 | Jarrett | F02F 3/0023 |
| | | | | 123/193.6 |

FOREIGN PATENT DOCUMENTS

| | | |
|---|---|---|
| CN | 106194483 A | 12/2016 |
| DE | 1939435 A1 | 2/1971 |
| DE | 2432990 A1 | 1/1975 |
| DE | 2545589 A1 | 4/1977 |
| DE | 3814427 A1 | 11/1988 |
| GB | 2125517 B | 3/1987 |
| JP | S59194064 A | 11/1984 |
| JP | 2013185460 A | 9/2013 |
| WO | 8501314 A1 | 3/1985 |
| WO | 2017146598 A2 | 8/2017 |

OTHER PUBLICATIONS

PCT Search Report and Written Opinion issued in PCT/EP2019/074694 dated Nov. 29, 2019, 13 pages. No English translation available.

Communication under Article 94(3) EPC issued in European Patent Application No. 19769477.1 dated Nov. 11, 2022, with English translation, 10 pages.

Chinese Office Action issued in Chinese Patent application No. 201980061640.4 dated Nov. 14, 2022 with English translation.

* cited by examiner

PISTON FOR AN INTERNAL COMBUSTION ENGINE

BACKGROUND

Technical Field

The present disclosure relates to a piston for an internal combustion engine.

Description of Related Art

In conventional internal combustion engines, the pistons are manufactured from aluminum or steel. Although these two materials have very great differences with regard to thermal conductivity, the effective heat dissipation via both variants is very similar in a direct comparison. One explanation for this phenomenon may lie in the fact that the heat transfer coefficient from the flame to the combustion chamber surface is dependent on the respective wall temperature. Thus, although the steel piston has a higher wall temperature than the aluminum piston, the heat transfer coefficient and the heat flow thereby also increase.

DE 38 14 427 A1 discloses a reciprocating-piston internal combustion engine with autoignition, in which, at least in the case of a proportion of the walls that delimit the combustion chamber, the heat dissipation to the material surrounding the walls takes place via heat bridges provided between the walls and the material surrounding them. The heat bridges are, during the warm-up phase and in part-load operation of the internal combustion engine, interrupted at least partially by the formation of air gaps for the purposes of increasing temperature.

U.S. Pat. No. 4,018,194 A discloses a piston for an internal combustion engine, having a top side which forms a part of a combustion chamber. The piston is equipped with a cavity or a deep depression in the top side in order to promote the mixing of fuel and air and improve the combustion process in the combustion chamber. The cavity is formed in a cup-shaped insert part which is positioned in the piston body such that the cup-shaped insert part is substantially spaced apart or insulated from the piston body, whereby heat losses to the piston walls are prevented or minimized.

U.S. 2008/0041333 A1 discloses a piston for an internal combustion engine, which piston has an upper crown with an upper and a lower surface and a lower crown with an upper and a lower surface. The upper crown and the lower crown are fixedly connected to one another by weld seams, wherein the bottom side of the upper crown and the top side of the lower crown form a mating surface. The piston furthermore has at least one air gap formed centrally on the mating surface. The air gap is sealed off in order to prevent an air flow into or out of the air gap.

SUMMARY

The present disclosure is based on the object of providing an alternative and/or improved piston for an internal combustion engine.

The object is achieved by means of the features as claimed in independent claim 1. Advantageous refinements are specified in the dependent claims and in the description.

The present disclosure provides a piston for an internal combustion engine (for example diesel direct injection internal combustion engine and/or reciprocating-piston internal combustion engine). The piston has a piston crown for the preferably piston-side delimitation of a combustion chamber of the internal combustion engine. The piston has a cover which at least partially covers the piston crown (for example a piston depression of the piston crown), preferably at a combustion chamber side. Between the cover and the piston crown, there is formed a thermally insulating gap, preferably air gap, which has a (for example direct and/or indirect) fluidic connection to the combustion chamber and/or to a top side, averted from the thermally insulating gap, of the cover.

The cover makes it possible that, during the combustion in the combustion chamber, a flame front at least partially does not come into contact with the piston crown. The thermally insulating gap forms a barrier which reduces heat conduction from the combustion chamber to the piston crown. The surface temperature of the piston crown therefore does not increase as intensely as in the case of conventional pistons without a cover. Owing to the reduced surface temperature of the piston crown, there is also a resulting reduced heat transfer coefficient from the combustion chamber to the piston. Consequently, the piston does not need to be so intensely cooled. The fluidic connection to the thermally insulating gap furthermore allows a fluid exchange to occur between the thermally insulating gap and the combustion chamber. It is thus possible for a pressure gradient between the combustion chamber and the thermally insulating gap to be reduced. It is thereby made possible for the cover to be designed to be thin without being deformed during the combustion. This has the advantage that, the thinner the cover, the less heat the cover can absorb during the combustion. The less heat the cover absorbs during the combustion, the less heat the cover releases to the charge air during the charge exchange. The volumetric efficiency of the internal combustion engine is thus reduced to a lesser extent.

The piston crown may expediently be a region of a for example cast or printed main body of the piston.

The cover may preferably be formed separately from a main body of the piston.

It is possible for the piston crown of the piston to be cooled by means of cooling channels in the piston below the piston crown.

In one exemplary embodiment, the fluidic connection is designed to allow a pressure approximation and/or a pressure equalization between the combustion chamber and the thermally insulating gap.

In a further exemplary embodiment, a pressure on the top side of the cover and a pressure on a rear side, which faces toward the thermally insulating gap, of the cover are approximated and/or substantially equalized during the operation of the internal combustion engine by means of the fluidic connection.

In a further exemplary embodiment, the cover is arranged so as to separate a flame front during a combustion in the combustion chamber from the piston crown, preferably from a piston depression of the piston crown.

In a further exemplary embodiment, the fluidic connection is arranged spaced apart from a fuel injection jet impingement region of the cover.

The fuel injection jet impingement region of the cover may expediently be formed by an encircling edge of an annular shoulder of a piston depression of the piston crown.

For example, the fluidic connection may be arranged above and/or below the fuel injection jet impingement region.

In a further exemplary embodiment, the fluidic connection is formed at least partially by at least one annular gap between the piston crown and the cover.

The at least one annular gap may preferably have a width between greater than or equal to 0.5 mm and/or less than or equal to 2 mm, preferably of approximately 1 mm.

In one embodiment, the fluidic connection is formed at least partially by an annular gap between an outer circumferential edge of the cover and the piston crown.

For example, the annular gap between the outer circumferential edge of the cover and the piston crown may be arranged above a fuel injection jet impingement region of the cover.

The annular gap between the outer circumferential edge of the cover and the piston crown may expediently be arranged so as to be spaced apart outwardly in a radial direction from a fuel injection jet impingement region of the cover, preferably coaxially with respect to the fuel injection jet impingement region.

It is possible for the annular gap between the outer circumferential edge of the cover and the piston crown to be arranged at a top side of the piston.

In a further exemplary embodiment, the fluidic connection is formed at least partially by an annular gap between an inner circumferential edge of the cover and the piston crown.

For example, the annular gap between the inner circumferential edge of the cover and the piston crown may be arranged below a fuel injection jet impingement region of the cover.

The annular gap between the inner circumferential edge of the cover and the piston crown may expediently be arranged so as to be spaced apart inwardly in a radial direction from a fuel injection jet impingement region of the cover, preferably coaxially with respect to the fuel injection jet impingement region.

In a further embodiment, the fluidic connection is formed at least partially by at least one passage hole and/or at least one passage slot of the cover.

It is expediently possible for multiple passage holes and/or multiple passage slots to be arranged in a, preferably symmetrically, distributed manner in the cover.

In one refinement, multiple passage holes and/or passage slots are included, which are preferably arranged spaced apart from a fuel injection jet impingement region of the cover, preferably above and/or below the fuel injection jet impingement region of the cover.

For example, the at least one passage hole may have a diameter between 0.5 mm and 5 mm or more.

In one embodiment, the thermally insulating gap has a height greater than or equal to 0.5 mm and/or less than or equal to 2 mm, preferably of approximately 1 mm.

In a further embodiment, the thermally insulating gap has a substantially constant height.

In one design variant, the piston crown has a piston depression and the cover is arranged at least partially in the piston depression, preferably so as to at least partially cover the piston depression, and/or is adapted to the piston depression.

The cover may expediently be in the form of a piston inliner and/or a piston depression insert.

In one refinement, the piston depression has a central elevation, and the cover extends annularly around the central elevation, or the cover covers the central elevation.

In a further design variant, the fluidic connection is formed at least partially by an annular gap between an outer circumferential edge of the piston depression and an outer circumferential edge of the cover. Alternatively or in addition, the fluidic connection may be formed at least partially by an annular gap between an inner circumferential edge of the cover and a central elevation of the piston depression.

In one exemplary embodiment, a cross-sectional contour of the cover follows a cross-sectional contour of the piston depression, preferably with a substantially constant spacing.

In a further exemplary embodiment, the piston depression is in the form of an omega-shaped depression and/or of a stepped depression, preferably with a central elevation, and the cover at least partially has an omega-shaped and/or a stepped cross section.

In one embodiment, the cover is in the form of a metal sheet. Preferably, the metal sheet may have a substantially constant metal sheet thickness. Alternatively or in addition, the metal sheet may have a metal sheet thickness greater than or equal to 0.5 mm and/or less than or equal to 2 mm, preferably of approximately 1 mm.

In a further embodiment, the cover is welded, preferably by means of spot welding and/or friction welding, to the piston crown, preferably to a piston depression of the piston crown.

The present disclosure also relates to a motor vehicle, preferably a utility vehicle (for example heavy goods vehicle or bus), having a piston as disclosed herein.

It is also possible for the device as disclosed herein to be used for passenger motor vehicles, large engines, off-road vehicles, static engines, marine engines etc.

BRIEF DESCRIPTION OF THE DRAWINGS

The preferred embodiments and features of the present disclosure as described above may be combined with one another as desired. Further details and advantages of the present disclosure will be described below with reference to the appended drawings, in which.

DETAILED DESCRIPTION

The embodiments shown in the figures at least partially correspond, such that similar or identical parts are denoted by the same reference designations and, for the explanation thereof, reference will also be made to the description of the other embodiments or figures in order to avoid repetitions.

Figure 1:
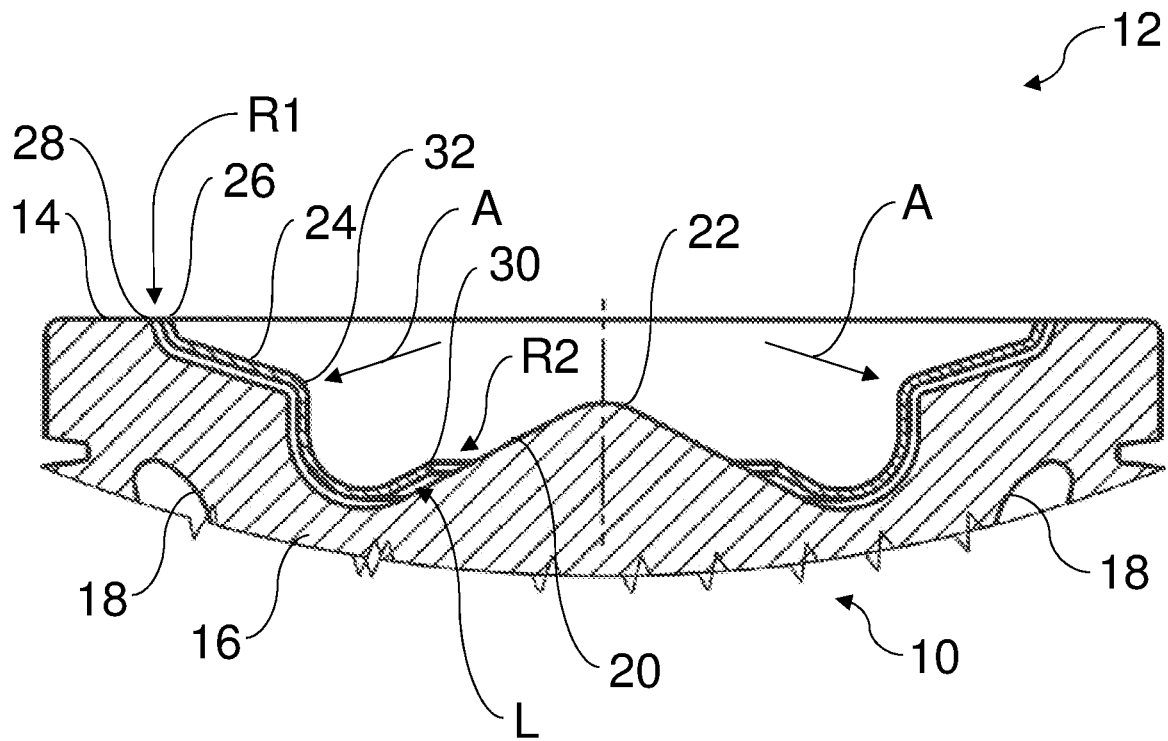
FIG. 1 shows a cross section through a piston upper part of a piston according to an exemplary embodiment of the present disclosure.

FIG. 1 shows an upper part of a piston 10. The piston 10 may be included in an internal combustion engine. The internal combustion engine may for example be a diesel, gasoline and/or gaseous fuel internal combustion engine. The internal combustion engine may preferably be a diesel internal combustion engine with direct injection. The internal combustion engine may be included in a vehicle, for example motor vehicle, rail vehicle or watercraft, or in a static installation, for example for driving a generator or some other assembly. For example, the internal combustion engine may be included in a utility vehicle, for example a heavy goods vehicle or a bus.

The piston 10 is arranged, in a manner not illustrated in any more detail, so as to be movable in reciprocating fashion in a cylinder of the internal combustion engine, expediently by means of a connecting rod which connects the piston 10 to a crankshaft in articulated fashion. The piston 10 delimits a combustion chamber 12 of the cylinder.

The piston 10 has a piston crown (also referred to as piston roof) 14. The piston crown 14 forms a combustion-chamber-side top side of a for example cast or printed main body 16 of the piston 10.

The piston 10 may, for the cooling of the piston crown 14, have one or more cooling channels 18. A cooling fluid, for example oil, can be conducted within the cooling channels 18 in order to absorb heat from the piston crown 14 and to carry said heat away. The cooling channels 18 may be arranged below the piston crown 14. A material thickness of the main body 16 between a top side of the piston crown 14 and the cooling channels 18 may for example amount to at least 5 mm.

Figure 2:
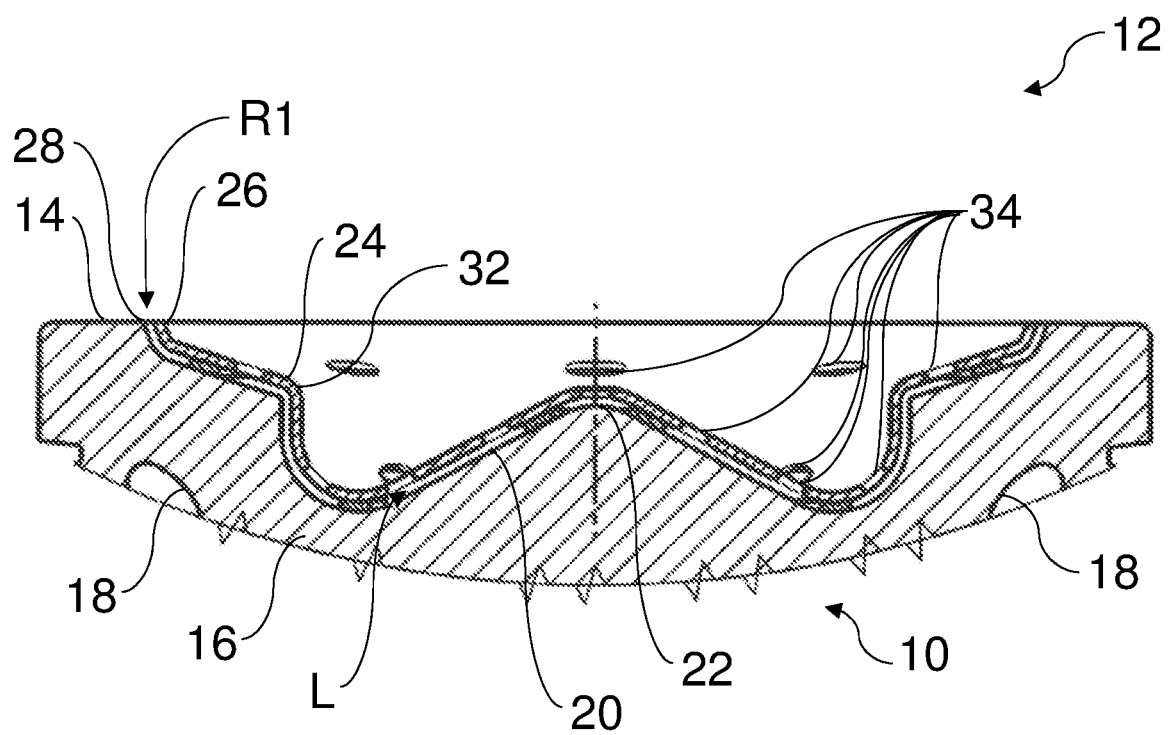
FIG. 2 shows a cross section through a piston upper part of a piston according to a further exemplary embodiment of the present disclosure.

As illustrated in FIGS. 1 and 2, the piston crown 14 may have a piston depression 20. The piston depression 20 may have any known shape. For example, the piston depression 20 may be in the form of a stepped piston depression which has a central elevation 22, as illustrated. Stepped piston depressions may be suitable in particular for diesel operation with direct injection. The diesel fuel may for example be divided up preferably symmetrically into multiple injection jets by a central injector, which injection jets are directed onto an encircling top edge or a shoulder of the stepped piston depression (cf. arrow A in FIG. 1). The injection jets may then be split up upon impingement, such that the fuel is conducted partially into the piston depression 20 and partially away from the piston depression 20. It is for example also possible for the piston depression 20 to be shaped in some other way, for example as an omega-shaped piston depression.

The piston 10 has a cover 24. The cover 24 is formed separately from the main body 16. Preferably, the cover 24 is in the form of a thin metal sheet. For example, the cover 24 may have a metal sheet thickness in a range between 0.5 mm and 2 mm, preferably of approximately 1 mm. The metal sheet thickness of the metal sheet may be substantially constant.

The cover 24 may be formed such that it is arranged within the piston depression 20 and expediently does not protrude beyond the piston depression 20, and/or is flush with a top side of the main body 16.

The cover 24 is arranged spaced apart from the piston crown 14. As illustrated, a cross-sectional contour of the cover 24 may follow a contour of the piston depression 20, preferably with a substantially constant spacing. For example, the cover 24 may at least partially have a stepped and/or omega-shaped cross section, like the piston depression 20. It is however also possible for the cover 24 and/or the piston crown 14 to have any other shape, which includes the case of a planar piston crown and a planar cover.

A gap L is formed between the cover 24 and the piston crown 14. The gap L acts as thermal insulation between the cover 24 and the piston crown 14. The gap is preferably designed formed as an air gap. During the operation of the internal combustion engine, the cover 24 heats up very intensely. Here, the cover 24 keeps the flame front during the combustion away from the piston depression 20. The piston depression 20 is not warmed by the flame during the combustion. Additionally, the gap L impedes heat conduction from the intensely heated cover 24 to the piston depression 20. It is thus expediently possible for a heat flow from the cover 24 to the piston crown 14 to be minimized.

The gap L may for example have a height between 0.5 mm and 2 mm, preferably of approximately 1 mm. The gap L may have a substantially constant height.

During the combustion, the cover 24 absorbs heat, which said cover for example releases to the inlet air during the charge exchange. The thinner the cover 24 is designed to be, the less the charge air is warmed, and the less the volumetric efficiency of the internal combustion engine is reduced.

During the ignition of a fuel-air mixture in the combustion chamber, high ignition pressures can arise, for example in a range between 200 bar and 250 bar. In order to prevent a thin cover 24 from bending for example during the ignition of the fuel-air mixture, the gap L is fluidically connected to the combustion chamber 12. Fluid can thus be exchanged between the combustion chamber 12 and the gap L. Via the fluidic connection, a pressure increase in the combustion chamber, for example during the ignition and the combustion of fuel, can also act on a rear side of the cover 24. In this way, a pressure equalization between the combustion chamber 12 and the gap L is made possible. A pressure on a front side or top side of the cover 24 can substantially correspond to a pressure on a rear side or bottom side of the cover 24. It is at least possible for the fluidic connection to approximate a pressure on the rear side of the cover 24 to a pressure on the front side of the cover 24.

In this way, bending of the cover 24 as a result of a pressure increase in the combustion chamber 12 is prevented, without the cover 24 having a large material thickness for this purpose.

The fluidic connection between the combustion chamber 12 and the gap L may be implemented in a variety of ways.

In the exemplary embodiment of FIG. 1, the cover 24 is formed as an annular insert for insertion into the piston depression 20. The central elevation 22 extends through a central passage hole in the cover 24. The cover 24 and the piston depression 20 are connected to one another such that an annular gap R1 is formed between an outer circumferential edge 26 of the cover 24 and an outer circumferential edge 28 of the piston depression 20. Additionally, an annular gap R2 is formed between an inner circumferential edge 30 of the cover 24, that is to say the circumferential edge of a central passage hole of the cover 24, and a circumferential surface of the central elevation 22. The annular gaps R1, R2 form a direct fluidic connection between the combustion chamber 12 and the gap L.

The fluidic connection between the combustion chamber 12 and the gap L is preferably arranged so as to be arranged spaced apart from a fuel injection jet impingement region 32 of the cover 24. In this way, it is possible to prevent a flame that forms as a result of the fuel injection jets from impinging directly on the fluidic connection and entering the gap L, with the result that the piston crown 14 is warmed. This spaced-apart arrangement between the fluidic connection and the fuel injection jet impingement region 32 can for example be formed in an advantageous manner by the annular gaps R1 and R2.

FIG. 2 shows further additional or alternative possibilities for the production of a for example direct fluidic connection between the combustion chamber 12 and the gap L. For example, the cover 24 may have multiple passage holes 34. For the sake of improved clarity, only some of the passage holes are denoted by the reference designation 34 in FIG. 2.

The passage holes 34 connect a front side of the cover 24 to a rear side of the cover 24, and thus connect the combustion chamber 12 to the gap L. The passage holes 34 may be arranged in a distributed manner in the cover 24. The passage holes 34 are preferably arranged spaced apart from the fuel injection jet impingement region 32, for example above and below the annular fuel injection jet impingement region 32.

It is also possible for the cover 24 to have, for example, passage slots or some other internal or external structure for producing the fluidic connection between the combustion chamber 12 and the gap L.

The cover 24 may be fixedly connected to the piston depression 20. The cover 24 and the piston depression 20 are preferably welded to one another, for example by means of spot welding or friction welding. The use of friction welding to attach the cover 24 to the piston depression 20 may result in mutually separate regions for the gap L. Here, it is expediently the case that a fluidic connection is provided for each region of the gap L for the connection to the combustion chamber 12, for example in the form of the passage holes 34, as illustrated.

The present disclosure is not restricted to the preferred exemplary embodiments described above. Rather, numerous variants and modifications are possible which likewise make use of the concept of the present disclosure and therefore fall within the scope of protection. In particular, the present disclosure also claims protection for the subject matter and the features of the subclaims independently of the claims to which they refer. In particular, the features of independent claim 1 are disclosed independently of one another. Additionally, the features of the subclaims are also disclosed independently of all of the features of independent claim 1 and for example independently of the features regarding the presence and/or the configuration of the piston crown and/or of the cover of independent claim 1. All stated ranges herein are to be understood as being disclosed such that, as it were, all values that fall within the respective range are individually disclosed, for example also as respective preferred narrower outer boundaries of the respective range.

LIST OF REFERENCE DESIGNATIONS

10 Piston
12 Combustion chamber
14 Piston crown
16 Main body
18 Cooling channels
20 Piston depression
22 Central elevation
24 Cover
26 Outer circumferential edge
28 Outer circumferential edge
30 Inner circumferential edge
32 Fuel injection jet impingement region
34 Passage hole
A Fuel injection jet direction
L Gap (for example air gap)
R1 Annular gap
R2 Annular gap

What is claimed is:

1. A piston for an internal combustion engine comprising:
a piston crown for a piston-side delimitation of a combustion chamber of the internal combustion engine; and
a cover which at least partially covers the piston crown, wherein, directly between the cover and the piston crown, there is formed a thermally insulating gap which has a fluidic connection to the combustion chamber and/or to a top side, averted from the thermally insulating gap, of the cover,
wherein:
the piston crown has a piston depression, and the cover is at least partially arranged in the piston depression and/or adapted to the piston depression;
the piston depression is in the form of an omega-shaped depression and/or a stepped depression, and the cover at least partially has an omega-shaped and/or a stepped cross section; and
the fluidic connection is formed at least partially by an annular gap between an inner circumferential edge of the cover and a central elevation of the piston depression.

2. The piston as claimed in claim 1, wherein the thermally insulating gap is an air gap.

3. The piston as claimed in claim 1, wherein:
the fluidic connection is designed to allow a pressure approximation and/or a pressure equalization between the combustion chamber and the thermally insulating gap, and/or
a pressure on the top side of the cover and a pressure on a rear side, which faces toward the thermally insulating gap, of the cover are approximated and/or substantially equalized during the operation of the internal combustion engine by means of the fluidic connection.

4. The piston as claimed in claim 1, wherein:
the cover is arranged so as to separate a flame front during a combustion in the combustion chamber from the piston crown, and/or
the fluidic connection is arranged spaced apart from a fuel injection jet impingement region of the cover.

5. The piston as claimed in claim 4, wherein the cover is arranged so as to separate the flame front during the combustion in the combustion chamber from a piston depression of the piston crown.

6. The piston as claimed in claim 1, wherein:
the fluidic connection is formed at least partially by at least one annular gap between the piston crown and the cover.

7. The piston as claimed in claim 1, wherein:
the fluidic connection is formed at least partially by an annular gap between an outer circumferential edge of the cover and the piston crown; and/or
the fluidic connection is formed at least partially by an annular gap between an inner circumferential edge of the cover and the piston crown.

8. The piston as claimed in claim 1, wherein:
the fluidic connection is formed at least partially by at least one passage hole and/or at least one passage slot of the cover.

9. The piston as claimed in claim 8, wherein:
multiple passage holes and/or multiple passage slots are included, arranged spaced apart from a fuel injection jet impingement region of the cover.

10. The piston as claimed in claim 1, wherein:
the thermally insulating gap has a height greater than or equal to 0.5 mm and/or less than or equal to 2 mm, and/or approximately 1 mm; and/or
the thermally insulating gap) has a substantially constant height.

11. The piston as claimed in claim 1, wherein the piston depression has a central elevation, and
the cover extends annularly around the central elevation.

12. The piston as claimed in claim 1, wherein:
the fluidic connection is formed at least partially by an annular gap between an outer circumferential edge of the piston depression and an outer circumferential edge of the cover.

13. The piston as claimed in claim 1, wherein:
a cross-sectional contour of the cover follows a cross-sectional contour of the piston depression.

14. The piston as claimed in claim 13, wherein:
the cross-sectional contour of the cover follows the cross-sectional contour of the piston depression with a substantially constant spacing; and/or
the pistol depression is in the form of a stepped depression with a central elevation.

15. The piston as claimed in claim 1, wherein the cover is in the form of a metal sheet.

16. The piston as claimed in claim 15, wherein:
the metal sheet has a substantially constant metal sheet thickness; and/or
the metal sheet has a metal sheet thickness greater than or equal to 0.5 mm and/or less than or equal to 2 mm, and/or approximately 1 mm.

17. The piston as claimed in claim 1, wherein:
the cover is welded to the piston crown and/or a depression of the pistol crown.

18. The piston as claimed in claim 17, wherein:
the cover is welded by means of spot welding and/or friction welding.

19. A motor vehicle having a piston as claimed in claim 1.

\* \* \* \* \*